Aug. 1, 1967 A. D. WHITE 3,334,314
OPTICAL GAS MASER USING THE He³ ISOTOPE AS THE AUXILIARY GAS
Filed Nov. 18, 1963
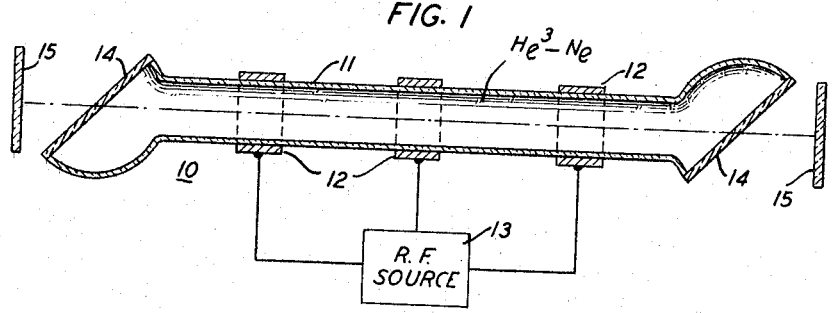
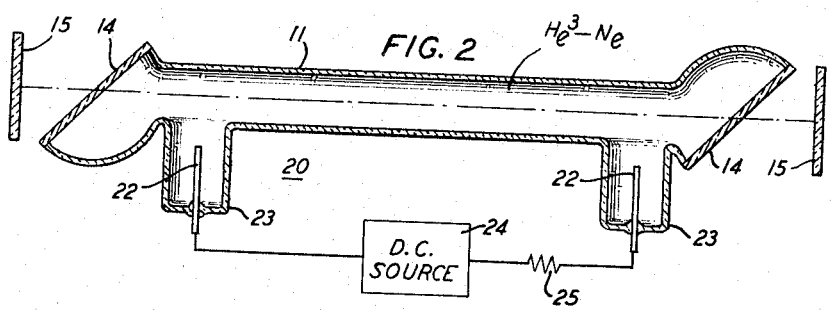
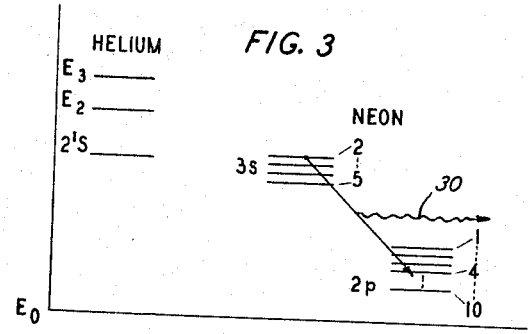
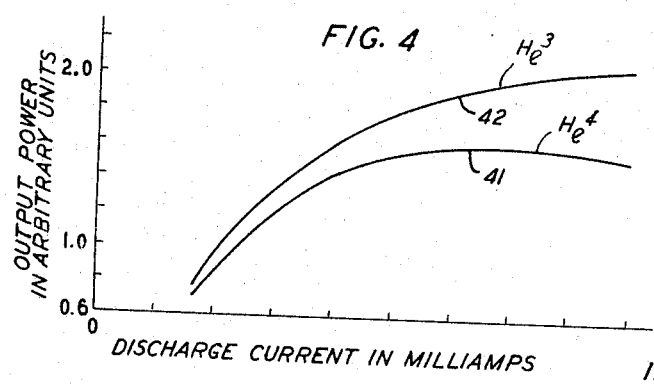
INVENTOR
A. D. WHITE
BY
ATTORNEY

United States Patent Office 3,334,314
Patented Aug. 1, 1967

3,334,314
OPTICAL GAS MASER USING THE He³ ISOTOPE AS THE AUXILIARY GAS
Alan D. White, Berkeley Heights, N.J., assignor to Bell Telephone Laboratories, Incorporated, New York, N.Y., a corporation of New York
Filed Nov. 18, 1963, Ser. No. 324,478
6 Claims. (Cl. 331—94.5)

ABSTRACT OF THE DISCLOSURE

A helium-neon laser in which the naturally occurring He⁴ isotope is replaced by He³. Power output per unit length is increased, permitting either higher gains or the use of shorter laser tubes which produce single frequency operation.

---

This invention relates to optical masers and, more particularly, to optical masers employing gaseous negative temperature media.

This application is a continuation-in-part of my application Ser. No. 312,492, filed Sept. 30, 1963.

The terms optical maser and laser, used interchangeably hereinafter refer to devices involving electromagnetic radiation in the infrared, visible, and ultraviolet frequency ranges. This frequency range will be referred to as the optical frequency range.

It is now well known that amplification of electromagnetic wave energy can be achieved by emission of radiation from media in which there is produced a population inversion in a characteristic energy level system. Such media are generally referred to as negative temperature media and the amplification process is termed laser action or, more simply, lasing.

In order for a medium to be useful as a negative temperature medium in an optical maser, it is essential that it be responsive to being pumped; that is, that there be a way to increase the population of the upper energy level of an optically connected pair of energy levels, so that it exceeds the population of the lower energy level of the pair. Numerous arrangements, involving both solid state media as well as gaseous media, are now well known.

The fields of application for optical masers, particularly communications, often require continuously operating devices characterized by a low associated noise level and a high degree of monochromaticity. Due to the relatively more complex crystalline structure of solid maser media, low noise performance has generally heretofore been obtained with gaseous negative temperature media. However, the output power level of typical gas lasers has been less than generally desired for long distance or high power laser applications.

It is therefore the object of the present invention to increase the output power level of gaseous optical masers.

Additionally, because the power gain per unit length of discharge was low, the prior art gaseous laser structures have been long and cumbersome and, due to the large spacing between the mirrors of the optical cavity, have tended to oscillate at many discrete frequencies simultaneously. In order to reduce the length of the optical cavity and thereby achieve single frequency-operation, the length of the laser tube must be reduced to a few centimeters. Reducing the laser tube length of course reduces the net gain per pass thus making laser oscillation at usable powers difficult to achieve in prior art arrangements.

It is therefore an additional object of the invention to achieve substantially single frequency operation in a practical gaseous laser.

A feature of one laser embodiment in a accordance with the invention is small physical length, of the order of a few centimeters.

Several classes of gas lasers are now well known. In each, the amplification process depends upon population inversion achieved through atomic collisions in an electrical discharge.

In a first class, the negative temperature medium comprises a single active gas of the noble gas family of helium, neon, argon, krypton, and xenon. In a typical noble gas laser, the noble gas atoms are excited by collisions with free electrons in a gaseous discharge. In order for a population inversion to result from electron-atom collisions, it is essential that the active gas atoms have a large cross section for direct electron excitation to the desired upper maser level or to a higher level which relaxes or decays thereto. It is also necessary that various competing effects produced by the interaction of electrons with the gas be maintained at a relatively low level. Thus pumping of gas lasers by electron-atom collisions requires careful selection of the active gas as well as precise control of environment factors such as pressure, geometry, and discharge intensity. In many cases, moreover, special measures must be taken to inhibit interactions which compete with the desired one.

The selectivity of excitation in a gaseous discharge is enhanced in a second class of lasers by mixing with the active gas an auxiliary gas which has a metastable energy state matching the upper maser level. The auxiliary gas is then excited to its metastable state by electron impact and, through resonant interaction in inelastic atom-atom collisions, the excitation is transferred to the active gas. In a variation of the technique, the auxiliary gas serves to populate a metastable state of the active gas which has a large cross section for excitation to a desired upper level. Although it is applicable to all combinations of gases which satisfy the particular energy level criteria, the particular selection of usable gases is limited by the close coincidence required of the energy levels between which the excitation transfer occurs.

One particularly well-known embodiment of the gas mixture type laser is the helium-neon laser disclosed in the co-pending, commonly assigned, application of A. Javan, Ser. No. 277,651, filed May 2, 1963.

I have discovered that the population inversion in a gas laser employing a mixture of an active gas with helium can be significantly increased by substituting the lighter isotope He³ for the more common isotope He⁴. In accordance with one theory of operation of the invention, output power and gain per unit length are increased by the isotope substitution as a result of an increase in the rate at which metastable atoms of the lighter He³ auxiliary gas are destroyed by collisions with active gas atoms relative to the rate at which metastable atoms of the same auxiliary gas are destroyed by collisions with electrons. With the available power and gain thus increased, laser size can be significantly reduced, permitting substantially single frequency operation.

Another aspect of the invention is the increase in discharge voltage gradient produced by the isotope substitution.

The above and other objects and features of the invention will be more completely understood from reference to the following more detailed description, taken in conjunction with the accompanying drawing, in which:

FIGS. 1 and 2 are longitudinal cross sectional views of optical masers in accordance with the invention;

FIG. 3 is an energy level diagram helpful in understanding the invention; and

FIG. 4 is a graphical illustration of the improvement in output power afforded by the invention.

Referring now to the drawing in greater detail, FIGS. 1 and 2 illustrate, in longitudinal cross section, optical masers 10 and 20 respectively, comprising an enclosing tube 11, which can be of quartz, containing a mixture of an active gas, neon, and an auxiliary gas, helium. These gases are characterized by energy levels which are critically related in a mannner to be pointed out in detail hereinafter. In accordance with the preferred embodiment of the present invention, the helium gas is substantially pure He³. He³ is a non-radioactive helium isotope produced as a by product in atomic reactors and having an atomic weight of 3, as contrasted with the naturally occurring He⁴ isotope found in nature and having an atomic weight of 4.

The helium concentration can correspond, for example, to a partial pressure of 0.7 torr and the neon concentration to a partial pressure of 0.1 torr. It is generally desirable that the partial pressure of helium exceed that of neon although laser action can occur with helium-neon ratios differing considerably from 7 to 1. For example, the invention is operative over a broad range of partial pressures, from 3 to 1 to 50 to 1, although the intensity of stimulated emission is not constant over this range. C. K. N. Patel presents measurements of power output versus various gas pressures in the He⁴-Ne laser in an article beginning at page 3194 of Volume 33 of the Journal of Applied Physics, November 1962. Similar relative performance, with higher gain per unit length, is exhibited by a similar He³-Ne laser in accordance with the present invention. The amount by which the gain and power output are increased by the substitution of He³ for He⁴ is proportional to the amount of He⁴ for which He³ is substituted. Thus in a gas mixture containing neon with helium in which 50 percent is He³ and 50 percent is He⁴, the improvement in gain and power output is approximately one half that realizable for a 100 percent He³ substitution. In general, however, it is necessary only to have a significant amount of He³ present in the gas mixture to achieve gain and power output improvement in accordance with the invention. Typically, the proportion of He³ would exceed the proportion of He⁴. In the preferred embodiment, the gas mixture would comprise neon with substantially 100 percent He³.

Encircling tube 11 in FIG. 1 are a plurality of electrodes 12 which are connected to a radio-frequency source 13 for providing energy to excite an electrical discharge through the active medium. A convenient frequency for operating the invention is about 25 megacycles, although it is to be understood that this is not critical and can be varied over an extremely wide range. Advantageously, the pump energy is of a frequency easily controlled and readily available at sufficient power levels to produce a discharge inside the tube 11, the walls of which should therefore be substantially transparent to such energy. Alternatively, microwave pump energy may be coupled to the active medium by means of a cavity, not shown in the drawing, resonant at that frequency and enclosing the gas filled tube. As illustrated in FIG. 2, a discharge can also be excited in the gaseous active medium by means of a direct current voltage applied from D-C source 24 through current limiting resistor 25 between electrodes included within the tube 11, such as electrodes 22. The electrodes 22 are housed in projections 23 which extend from the side of tube 11, thereby avoiding any obstruction of the light beam path along the axis of the tube. Furthermore, the projections 23 tend to trap any material evaporated or sputtered from the electrodes 22 which might otherwise contaminate the inside surfaces of tube 11. In both FIGS. 1 and 2, the ends of tube 11 comprise transparent windows 14 which define a light beam path through the active medium. To reduce reflections at the windows, they are inclined at Brewster's angle to the beam path, as disclosed in the copending, commonly assigned, application of A. G. Fox and L. U. Kibler, Ser. No. 304,300, filed Aug. 21, 1963.

It is characteristic of helium that its energy level system includes a large number of levels, only a small relevant portion of the system being shown in FIG. 3. For example, it is characteristic of the level corresponding to the $2^1S$ state (in the LS designation), that it is metastable. As the term is understood in the art, this means that the time it takes an atom in the $2^1S$ state to relax to the ground state $E_0$ is relatively long or, viewed differently, that the probability of the transition from the $2^1S$ state to ground state is small. On the other hand, the rate of decay between the higher levels $E_2$, $E_3$ to the $2^1S$ level is large so that there is a tendency for atoms in such higher levels to decay to $2^1S$ either by a direct transition as a result of collisions or in cascade fashion as a result of successive transitions. The net effect is an accumulation of atoms at the $2^1S$ level. The principal counter-effect is a decay of atoms from this level to the ground state as a result of collisions with the tube surfaces. However, it is possible by the application of sufficient radio-frequency or other energy to the helium to produce sufficient energetic free electrons for collisions with helium atoms to increase the population of helium atoms in the $2^1S$ level to a relatively high value.

As mentioned above, in a preferred embodiment tube 11 also includes neon gas. The relevant portion of the energy level system of neon also is depicted in FIG. 3. For example, neon includes four energy levels, $3s_2$, $3s_3$, $3s_4$, and $3s_5$ (in Paschen notation) whose separations from the ground state $E_0$ substantially match the separation between levels $E_0$ and $2^1S$ of helium. Moreover, neon also includes 10 energy levels, $2p_1 \ldots _{10}$, which are between level $E_0$ and the $3s$ levels and whose separations from such higher levels correspond to wavelengths in the visible optical range.

It is characteristic of a system of the kind described that the energy level $3s_2$ of the active gas will reach close to thermal equilibrium with energy level $2^1S$ of the auxiliary gas because each corresponds to essentially the same energy. Thus a large cross section will exist for inelastic collisions resulting in an exchange of energy between the $2^1S$ level of helium and the $3s_2$ level of neon. This exchange results in the neon population of the $3s_2$ level particularly increasing to the point at which its proportion of the total neon population will substantially match the proportion of $2^1S$ helium in the total helium population. Due to the adiabatic nature of the collisions, the levels of the neon atoms, such as $2p_4$, which differ in energy appreciably from that of the metastable level of the helium, are not directly affected. As a consequence, a negative temperature, or population inversion, can be established between the $3s$ and $2p$ levels. The separation of these two levels has a wave number of about 15,800 corresponding to a wavelength of about 6,328 angstroms.

In accordance with the maser principle it is known that when a negative temperature population inversion is established between a pair of energy levels in a medium, emission may be stimulated therefrom at a wavelength corresponding to the energy separation between the inverted levels. Stimulated emission occurs when radiation of the appropriate frequency is incident on the active medium and induces the excited particles to undergo transitions from the upper to the lower energy state. The emitted radiation, indicated by arrow 30, is coherent and in phase with the stimulating signal. In the absence of an externally applied signal, emission may be stimulated by photons emitted spontaneously by some of the excited particles as they relax to the lower energy level. In either case, the stimulated emission adds to the stimulating wave so that the signal experiences gain or amplification as it travels through the medium. The amount of the amplification is exponentially related to the length of the ray path in the medium and inversely proportional to its diameter. The elongated geometry of a typical optical maser embodying the invention tends to establish a preferred direction, e.g., the axial direction, such that photons spontaneously emitted in that direction undergo substantially greater amplification than photons emitted in off-axial directions. Thus, the energy emitted from an end of the tube 11 is substantially monochromatic and coherent. It will be apparent that the device can be employed either as a source of such energy, or as an amplifier of externally applied signals.

According to one theory by which the present invention increases the available output power, the presence of the $He^3$ isotope in the gas mixture causes a higher electron temperature condition to obtain as reflected in the increased discharge voltage gradient. In the presence of the higher electron temperature the rate at which helium atoms are excited to the $2^1S$ level is increased, thereby increasing the population of the $2^1S$ level. Additionally, the rate at which collisions occur between helium atoms at the $2^1S$ level and neon atoms at the ground state, thereby raising the latter to the $3s_2$ state from which emission at the desired frequency can be stimulated, is increased; while the rate at which collisions occur between helium atoms at the $2^1S$ level and excited electrons in the discharge, thereby causing the helium atoms to fall once again to a ground state without transfer of energy to the active neon gas, is either reduced or increased by a lesser amount.

To make it possible for the energy emitted to reach greater intensity and to encourage coherent emission, it is desirable that there be favored the buildup of oscillations of the frequency corresponding to the separation between levels $2p_4$ and $3s_2$.

To this end, reflective plates 15 and 16 are positioned at opposite ends of the envelope 11 in FIGS. 1 and 2 adjacent the windows 14 thereby enabling standing waves of the oscillatory energy to be set up between them. As is characteristic, such plates are made to be highly reflective of the energy of the wavelength of interest while absorbing as little as possible and transmitting a small portion of such energy. In particular, their thickness is preferably made such that the reflections at the two faces add in phase for the wavelength of interest. Ordinarily, it is more convenient from the standpoint of adjusting their separation for optimum results that the reflective plates be separate elements as shown. Alternatively, either or both of such elements may be positioned inside the envelope or incorporated as an end plate thereof. As with the device operating without mirrors, the optical maser utilizing a cavity resonator is capable of acting as either a generator or an amplifier.

A particularly advantageous aspect of the present invention can be realized in the configuration of FIGS. 1 and 2. The increased power output, or gain provided by the $He^3$ substitution permits the length of the cavity between end reflectors 15, 16 and therefore the length of tube 11 to be reduced from the typical prior art length of one meter by a factor 18 without destroying the necessary oscillation condition. At the same time, the radial dimension of tube 11, typically 6 millimeters in prior art tubes, is reduced by a factor of 6. The resultant arrangement, in which tube 11 typically has a length of two inches and a diameter of one millimeter, is readily adaptable to a host of practical uses, both in the laboratory as a research tool and in commerce as a compact coherent energy source in optical, metrological, and communications applications.

In addition to and as a result of, the reduced physical size, fewer discrete frequencies of oscillation are emitted in the smaller multimode cavity arrangement. Oscillation at a single discrete frequency, tunable over a 1500 megacycle range centered at $4.73 \times 10^{14}$ c.p.s., has been attained by varying slightly the optical path length between the mirrors. The total mechanical motion required to tune over the entire range is less than .000012 inch. Thus, by connecting one laser extremity to a positioning device and monitoring the frequency of the laser output, minute position differentials can be detected. Other methods of tuning, involving an electronically variable path length for example, are also possible.

Measurements of the output of gaseous optical masers employing mixtures of neon and $He^3$ having been made, and one resultant plot appears in graphical form as FIG. 4. The measurements were carried out with a standard one meter long, 6 millimeter inside diameter, D-C excited laser tube provided with quartz Brewster angle output windows. The gases which produced curve 41 in FIG. 4 were spectroscopic grade neon and spectroscopic grade $He^4$. For curve 42, identical neon was mixed with 99 percent $He^3$ in 99.8 percent helium, such as that obtainable from Monsanto Research Corporation, Miamisburg, Ohio. Both helium gases exhibited essentially the same spectrum with no indication of impurities other than a possible trace of neon. With partial pressures of 0.1 torr neon and 0.5 torr helium, the power output of all modes was measured as a function of discharge current. Curve 42 in FIG. 4 shows an increased power output of over 25 percent over that of curve 41 at maximum output. Subsequent test runs in small lasers have consistently produced output power increases of 50 percent and, at single values of discharge current, power increases up to 100 percent have been observed.

Due to the relatively small amount of helium gas required, the increase in cost of materials to realize the substantial power increase in accordance with the invention is minimal, being of the order of a few cents in a typical laser of a given size. The resultant reduction in physical size permitted by the substitution may actually reduce material costs below those of the prior art.

It is to be understood that the specific embodiments described are merely illustrative of the general principles of the invention. Various other embodiments may be devised without departing from the spirit and scope of the invention. In particular, the preferred form of gaseous optical maser described may be modified to utilize different gases as the active gas with $He^3$ as the auxiliary gas.

For example, it is feasible to employ xenon typically at a pressure of $10^{-2}$ torr and helium at a pressure of 1 torr, or mercury vapor at a pressure of about $10^{-2}$ torr and helium at a pressure of 1 torr.

Furthermore, the invention is not limited to the particular tube and cavity geometries illustrated in FIGS. 1 and 2. For example it may be desirable in some applications to use the discharge tube arrangement disclosed and claimed in the copending application of W. Gronros and E. J. Walsh, Ser. No. 310,268, filed Sept. 20, 1963, and assigned to the assignee of this application.

What is claimed is:

1. An improved optical maser of the type having
   means for producing free electrons within an enclosed space, an auxiliary and an active gas within said enclosed space,
   said auxiliary gas possessing a metastable energy level above its ground state to which atoms thereof can be raised by collision with said free electrons,
   said active gas possessing an energy level system with at least two levels above the ground state,
   the separation of the higher of said two levels from the ground state substantially matching the separation of said metastable level of the auxiliary gas from its ground state, so that atoms of the auxiliary gas which are in the metastable state collide with ground state atoms of the active gas and excite said ground state atoms to said higher level, thereby creating a population inversion between a pair of energy levels of said active gas so that emission of coherent optical radiation may be stimulated at a frequency corresponding to the energy separation therebetween, means for forming resonant modes of said coherent radiation within the enclosed space comprising two optically reflecting members defining a light beam path therethrough, and means for abstracting a portion of said coherent radiation for utilization, the improvement comprising said auxiliary gas consisting of a predominant proportion of the $He^3$ isotope of helium.

2. The optical maser of claim 1 in which the length of said light beam path between said reflecting members is of the order of two inches.

3. The optical maser of claim 1 in which said active gas is neon.

4. An improved optical maser for producing coherent optical radiation and being of the type having means forming an enclosed space for containing a gaseous active medium, said active medium including helium gas having a metastable energy state above the ground state and neon gas having an upper and an intermediate energy state above its ground state, means for pumping said active medium to excite said helium gas to its metastable state, and means defining a light beam path through said active medium for stimulating coherent emission therefrom, the improvement comprising said helium gas consisting of at least 50 percent $He^3$.

5. An optical maser as in claim 4 including means forming an optical cavity resonator including said active medium, and means for abstracting a portion of the stimulated emission from said resonator.

6. An improved optical maser of the type having an elongated negative temperature medium, means for applying excitation energy to said medium for establishing a population inversion therein, an elongated optical interferometer cavity comprising first and second external reflective end members, said negative temperature medium being disposed within said cavity in the path of light rays reflected between said end members, said negative temperature medium comprising a mixture of an active gas and an auxiliary gas, and means for abstracting for utilization at least a portion of said rays, the improvement comprising said auxiliary gas consisting of helium in which the amount of $He^3$ isotope is greater than the total of other helium isotopes present.

References Cited

UNITED STATES PATENTS 3,149,290   9/1964   Bennett et al. _____ 331—94.5
3,250,721   5/1966   De Paolis _____ 331—94.5 X

OTHER REFERENCES

Harris, K. D., "Lasers," Electronic Technology, pp. 86–94, March 1962.

McFarlane, R. A., Bennett, W. R., and Lamb, W. E. "Single Mode Tuning Dip in the Power Output of an He–Ne Optical Maser," Applied Physics Letters, vol. 2, No. 10, pp. 189–190, May 15, 1963.

JEWELL H. PEDERSEN, *Primary Examiner.*

DAVID H. RUBIN, *Examiner.*

P. R. MILLER, *Assistant Examiner.*